Dec. 24, 1957 H. W. IHRIG 2,817,152
CHECKING AND LAYOUT APPARATUS
Filed Aug. 27, 1954 2 Sheets-Sheet 1

INVENTOR
HARVEY W. IHRIG
BY
ATTORNEYS

Dec. 24, 1957  H. W. IHRIG  2,817,152
CHECKING AND LAYOUT APPARATUS
Filed Aug. 27, 1954  2 Sheets-Sheet 2

INVENTOR
HARVEY W. IHRIG

BY
ATTORNEYS

United States Patent Office 2,817,152
Patented Dec. 24, 1957

2,817,152

CHECKING AND LAYOUT APPARATUS

Harvey W. Ihrig, Odenton, Md.

Application August 27, 1954, Serial No. 452,742

2 Claims. (Cl. 33—174)

(Granted under Title 35, U. S. Code (1952), sec. 266)

The invention described herein may be manufactured and used by or for the Government of the United States of America for governmental purposes without the payment of any royalties thereon or therefor.

The present invention relates to a checking and layout method and apparatus, and more particularly to a method and apparatus for accuracy measurement of contour and profile gages, and for layout of workpieces for manufacture or tolerance check.

Commonly known methods and apparatus for layout or checking of gages and workpieces are accurate for use only for small workpieces. This limitation is due to inaccuracies introduced both by human error and precision instrument error when long lengths of sine bar are necessary to measure angles of a large workpiece. Another deficiency of the present layout methods and apparatus is that a number of surface plate setups are necessary to locate the angular and radial surfaces of a product in a common plane.

The present invention overcomes the afore-mentioned limitations of known methods and apparatus for layout and checking of gages and workpieces either for accuracy measurement or for manufacture by the presentation of a unique radius arm method and device to be used in combination with locator discs and a novel sine bar for locating various long length radii and angular surfaces of a product or gage evident in a common plane. By the utilization of a radius center point as a reference point, only one master setup is required in order to measure or machine an article of manufacture to close tolerances.

An object of the present invention is the provision of a method and apparatus for measuring or locating a workpiece or gage on a surface plate to fine accuracy.

A further object is to provide a radius arm center pivot support and arm support for measuring or checking relatively long radii to within precision tolerance.

Another object of the present invention is the provision of a sine bar of a construction which affords extremely true measurement of angles.

A still further object is to provide a method for locating every surface of one plane of an article of manufacture to proper allowances by reference to a radius center point in that plane.

Still another object of the present invention is the provision of a simplified method of measuring, laying out, or machining of surfaces of a product.

Another object is the provision of a method of setup for precision measurement, machining, or layout of a product which establishes the product within an area defined by reference points on a surface plate to achieve true measurement, machining, or layout of the product.

Other objects and many of the attendant advantages of this invention will be readily appreciated as the same becomes better understood by reference to the following detailed description when considered in connection with the accompanying drawings wherein.

Figure 1:
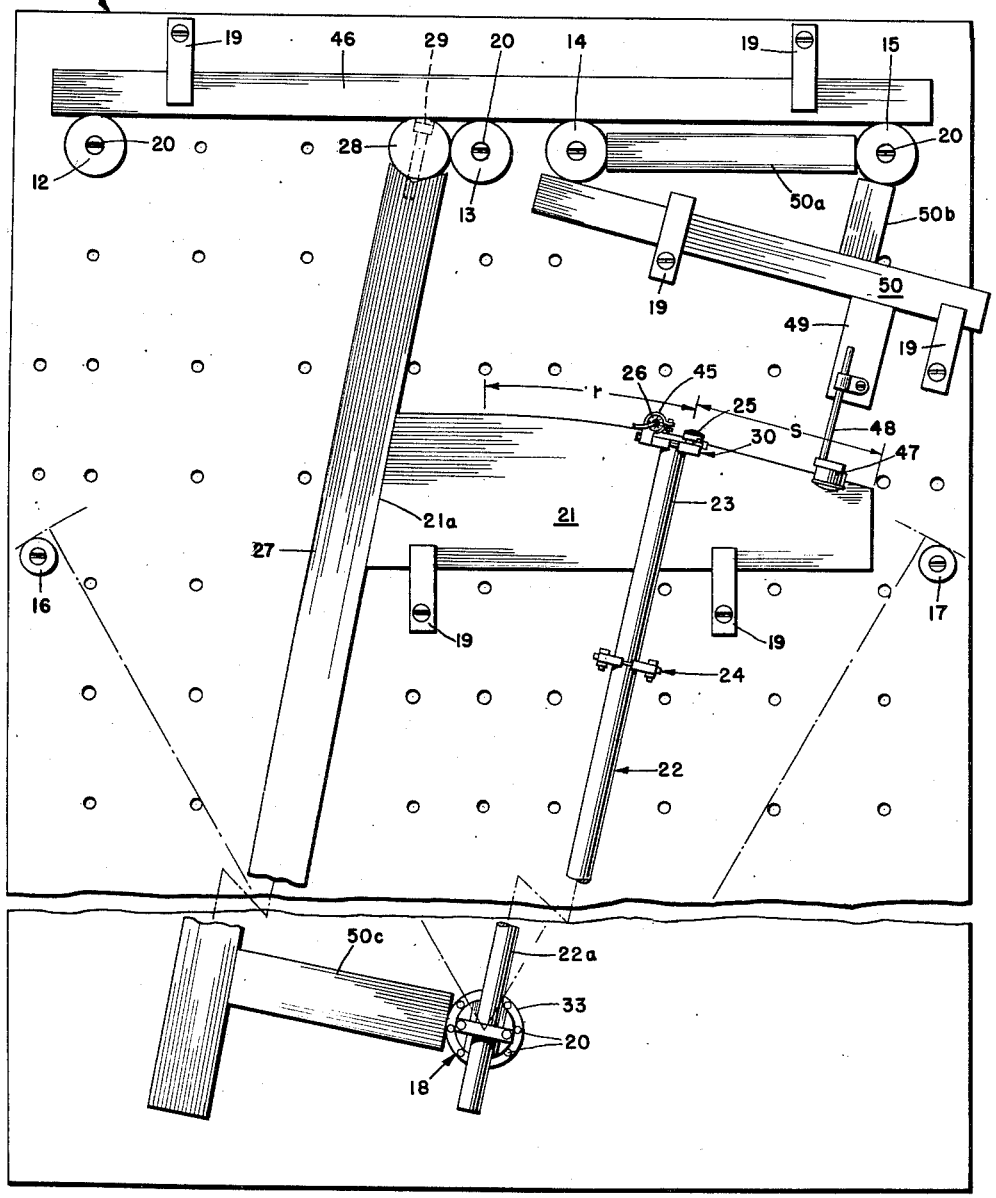
Fig. 1 illustrates a plan view of a preferred embodiment of the invention setup on a surface plate.

Referring to the drawings, wherein like reference characters designate like or corresponding parts throughout the several views, there is shown in Fig. 1, which illustrates a preferred embodiment, surface plate 11 having a number of perforations situated therethrough. Locating fixtures such as toolmaker's buttons 12, 13, 14, 15, 16, 17, and pivot center support 18 are secured to the perforations of surface plate 11 by suitable screws 20 to accurately position, for machining or measuring a workpiece 21, for example, within an area defined by such fixtures and pivot center support 18.

Radius arm 22, having an inner portion 22a and an outer portion 23, is pivotably mounted at inner portion 22a by pivot center support 18 which is engaged to surface plate 11 or a remote position thereto to establish long length radii on workpiece 21. Radius arm 22 may be supported at its outer portion 23 by roller support 24 which enables the arm 22 to be arcuately swung on surface plate 11 with pivot center support 18 as the center point of the circle of the arc. Connected to the outermost end of arm 22 is a bracket 30 (Fig. 4) which may hold a measuring gage 25 and a grinder 26.

Since bar 27 is shown in Fig. 1 in position to determine an angle of workpiece 21 which lies adjacent thereto. A disc member 28 of a diameter equal to the width of bar 27 is threadedly engaged by screw 29 to a notch in the end of bar 27 to provide a rounded surface for contact with points from which lengths are to be measured. The provision of a disc of known size to the sine bar allows more accurate measurement to the end of the bar which is the tangent of the disc rather than a squared end.

Straightedge 46 of Fig. 1 is shown for a purpose to be described hereinafter. Gage 47 is extended from block 49 by rod 48 clipped thereto in conventional fashion, and bar 50 describes the proper angle for the portion "s" of the edge of workpiece 21 to be contacted by gage 47. Size blocks 50a are utilized to lay off or measure exact lengths for determining angles in a conventional trigonometric manner.

Figure 2:
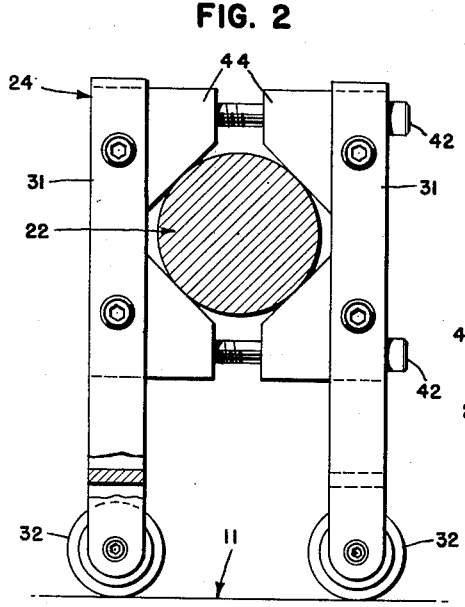
Fig. 2 shows a side elevational view of a radius arm support.

Fig. 2 shows the roller support 24 having rollers 32 connected to parallel, spaced-apart vertical legs 31. Opposed V blocks 44 are rigidly connected to legs 31 and are adjustably held apart by means of horizontal screws 42 to provide an opening through which radius arm 22 may be supported above the surface plate 11 to allow a swivellike movement of the arm 22 thereover.

Figure 3:
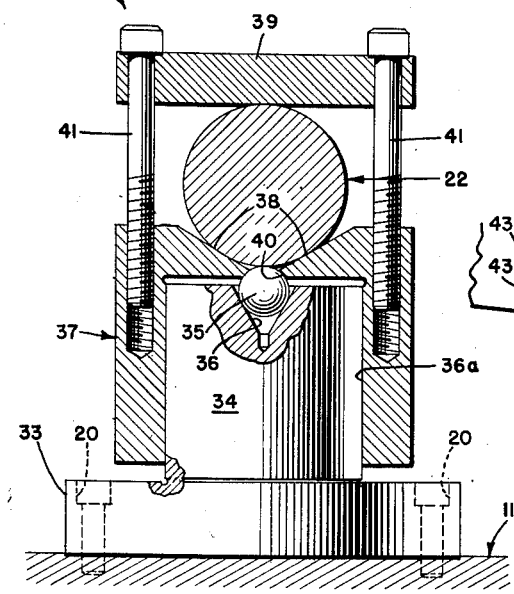
Fig. 3 illustrates a side elevational view partly in section of a radius arm pivot support.

Details of the center pivot support 18 are shown best in Fig. 3 wherein a base 33 is connected to surface plate 11 by means of countersunk setscrews 20 circumferentially positioned in base 33. A vertical standard 34 is centrally disposed on base 33 to provide a mating surface for an inverted cup member 37 which is pivotally received thereon. A counterbore is coaxially positioned on the upper surface of standard 34 to receive a sphere 35 therein tangent to the wall 36 of the counterbore and slightly protruding above the counterbore. A mating bore is provided in the upper surface 40 of the inverted cup to allow the sphere 35 to tangentially contact the cup bore. Cylindrical walls 36a of inverted cup 37 are closely mated to the wall surface of standard 34. A cradle 38 in upper surface 40 of the inverted cup 37 is concaved downwardly to receive the arm 22 thereon in a manner such that the central vertical axis of standard 34 passes vertically through sphere 35 and arm 22 and the arm 22 is contacted by the walls of cradle 38. A vertically-spaced, horizontal bar 39 is bolted by members 41 to the upper surface 40 of inverted cup 37 to define a space within which arm 22 is clamped.

Figure 4:
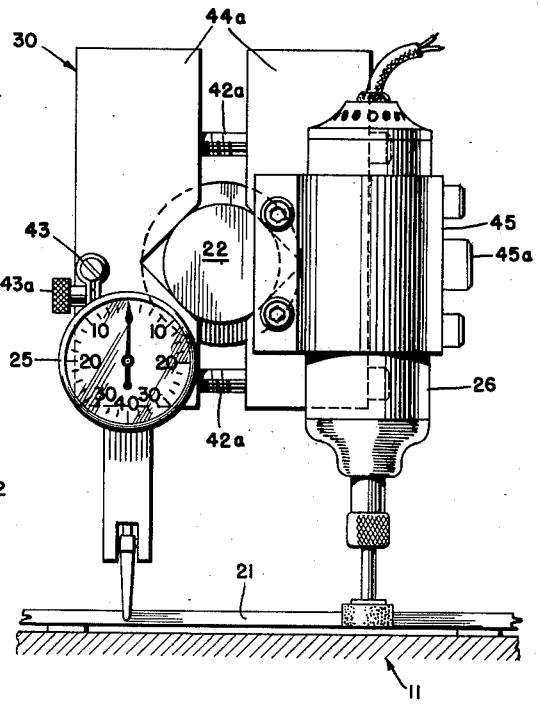
Fig. 4 shows a front elevational view of a grinder and gage bracket mounted on a radius arm.
Figure 5:
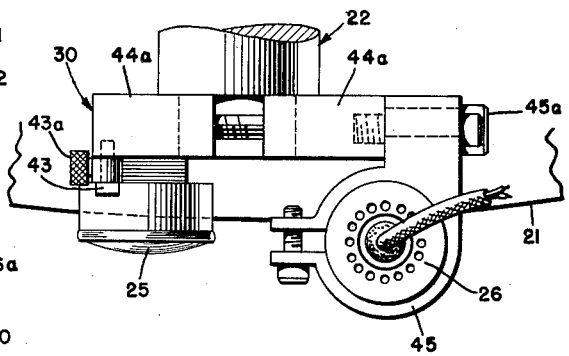
Fig. 5 illustrates a top plan view of the bracket shown in Fig. 4.

There is illustrated in Fig. 4 and Fig. 5 a bracket generally denoted as member 30. The bracket 30 is provided with opposed V blocks 44a adjustably spaced apart by horizontally-disposed bolts 42a. Within the confines of the opposed V's of the V blocks 44a a reduced end portion of the arm 22 is clamped to afford support for the bracket 30. On one block 44a a grinder 26 may be mounted by means of a clamp 45 which is eccentrically connected to the bracket 30 by eccentric screw 45a to allow adjustment in the direction of the longitudinal axis of arm 22. On the other of the opposed V blocks 44a may be mounted a gage 25 connected by suitable means such as clip and screw member 43. An adjusting screw 43a provides gage 25 movement in a direction similar to that of grinder 26.

Operations which may be performed by the present apparatus are carried out as follows:

To lay out a perpendicular on a surface plate 11, locating fixtures 12 and 15 are secured to surface plate 11 by screws 20. Arm 22 of a definite radius and with a gage attached on the end thereof is then swung from center pivot support 18 to each of the fixtures 12 and 15, and pivot support 18 is moved until fixtures 12 and 15 lie in the same arc. Pivot support 18 is then fixed in position by connecting screws 20 of base 33 to the surface plate 11 or an extension thereof. Next, locating fixture 13 of the same diameter as fixtures 12 and 15 is fixed at the center point of the chord between fixtures 12 and 15 which is the straightedge 46 held by clips 19. A line from the center of fixture 13 to the center of support 18 establishes a perpendicular with straightedge 46 from which linear measurements may be made by the use of size blocks 50a, for example.

To check a workpiece 21 for accuracy sine bar 27 is utilized to check the angularity of an edge 21a of the workpiece by layout of the prescribed angle. Layout is obtained by measuring proper lengths of the opposite and adjacent sides of the angle, space block 50c from pivot support 18 defining one side and either the sine bar 27 or an imaginary line from center support 18 to fixture 13 defining the other side. With the known sides the trigonometric function of the desired angle can be utilized to check or lay out the angle.

Radius "r" of the front edge of workpiece 21 is checked or layed out by swinging the proper radius with arm 22 from center point support 18 and measuring the radius by gage 25 mounted on the end of arm 22 by bracket 30. Reference locator fixtures 16 and 17 may be positioned to periodically check the desired radius to which gage 25 is set. To maintain arm 22 parallel with plate 11, roller support 24 stations arm 22 at the same height above surface plate 11 as does center pivot support 18.

By a separate gage 47 mounted on rod 48 and slideable block 49 the adjacent straightedge portion "s" of workpiece 21 may be layed out or checked to the required angle defined by bar 50 and size blocks 50a and 50b. This is done by sliding block 49 along bar 50.

It can be readily understood that grinder 26 may be used to machine surfaces of workpiece 21, and the gage 25 adjacently mounted thereto may provide a ready reference for the grinding operation limits.

Obviously many modifications and variations of the present invention are possible in the light of the above teachings. It is therefore to be understood that within the scope of the appended claims the invention may be practiced otherwise than as specifically described.

What is claimed is:

1. A radius checking instrument comprising a flat plate having a plurality of mutually spaced transversely and longitudinally aligned apertures formed therein, a pair of locating buttons secured to said plate in mutually spaced aligned relation with respect to each other and disposed within a pair of preselected apertures respectively for serving as a pair of reference points on the plate, a radius arm having one end thereof pivotally mounted on said plate and movable from one of the buttons to the other button, means including a standard formed on the plate, said standard being disposed at the apex of a triangle defined by lines connecting the buttons and standard, said standard pivotally supporting said one end of the arm on said plate to provide a pivot point in proximate relation with respect to one edge of the plate, a pair of adjustable blocks mounted on the other end of said arm, means including a V-shaped groove formed in each of said blocks and having the walls defining the grooves in engagement with said arm for adjustably supporting the blocks, a bracket adjustably mounted on one of said blocks, a gage carried by said bracket, contact means carried by said gage in engagement with and movable along an arcuate surface of a workpiece to be measured as the arm is moved from one of the buttons to the other button said buttons being equally spaced from the pivot point an amount equal to that of the gage contact means, said gage including means carried by said surface engaging means and controlled thereby for giving a visual indication of the measurements of said surface as said surface engaging means rides along said arcuate surface, an adjustable member mounted on said arm substantially midway between said pivoted supporting means and the pair of blocks, and roller means carried by said member in rolling engagement with said plate for additionally supporting said arm intermediate each end thereof and for providing free arcuate movement of said arm as the arm is moved between said buttons.

2. A radius checking instrument comprising a flat rectangular-shaped surface plate having a plurality of mutually spaced transversely and longitudinally aligned apertures formed therein, a radius arm having one end thereof pivotally mounted on said plate for arcuate movement, means including a standard carried by said plate for pivotally supporting said arm and providing a pivot point at one end thereof in proximate relation with respect to one edge of the plate and centrally between the two edges of the plate disposed at a right angle with respect to said one edge whereupon the arcuate movement of the other end of said arm is relatively large with respect to the movement of said one end of the arm, a pair of blocks adjustably mounted on said other end of the arm, means including a V-shaped groove formed in each of said blocks and having the walls defining the grooves in engagement with said arm for adjustably supporting the blocks on the arm, a bracket adjustably mounted on one of said blocks, a gage carried by said bracket, means carried by said gage in engagement with and movable along an arcuate surface of a workpiece to be measured as said arm is rotated about its pivoted supporting means, means carried by said surface engaging means and controlled thereby for giving a visual indication of the measurements of said arcuate surface as the surface engaging means rides along said arcuate surface, a pair of locating buttons settable at will to different settings within said apertures in mutual spaced relation with respect to each other and serving as a pair of reference points on the plate such that the working radius at which said gage is set may be periodically checked as the arm is moved to and fro between said buttons, said buttons being equally spaced from the pivot point an amount equal to that of the contact means carried by the gage, and means including a pair of rollers in engagement with said plate and adjustably mounted on said arm midway between said pivoted supporting means for additionally supporting the arm intermediate each end thereof and for providing free arcuate movement of the arm as the arm is moved between said buttons.

(References on following page)

References Cited in the file of this patent

UNITED STATES PATENTS

| Number | Name | Date |
|---|---|---|
| D. 102,387 | Moses | Dec. 15, 1936 |
| 1,014,803 | Bohn | Jan. 16, 1912 |
| 1,403,156 | Gonzalez | Jan. 10, 1922 |
| 1,463,440 | Pichler | July 31, 1923 |
| 1,516,838 | Arnold | Nov. 25, 1924 |
| 1,823,999 | Vine | Sept. 22, 1931 |
| 1,949,795 | Geh | Mar. 6, 1934 |
| 2,015,356 | Thurber | Sept. 24, 1935 |
| 2,318,871 | MacDonald | May 11, 1943 |
| 2,324,476 | Becker | July 20, 1943 |
| 2,341,418 | Atkins | Feb. 8, 1944 |
| 2,341,796 | Kuna | Feb. 15, 1944 |
| 2,347,111 | Jesionowski | Apr. 18, 1944 |
| 2,363,946 | Curry | Nov. 28, 1944 |
| 2,369,425 | Becker | Feb. 13, 1945 |
| 2,406,514 | Squire | Aug. 27, 1946 |
| 2,417,150 | Berry | Mar. 11, 1947 |
| 2,419,134 | Hall | Apr. 15, 1947 |
| 2,476,239 | Duncan | July 12, 1949 |
| 2,483,743 | Turrettini | Oct. 4, 1949 |
| 2,501,148 | Weis | Mar. 21, 1950 |
| 2,529,390 | Hauer | Nov. 7, 1950 |
| 2,534,367 | Perrotta | Dec. 19, 1950 |
| 2,536,629 | DeSousa | Jan. 2, 1951 |
| 2,564,376 | Schwartz | Aug. 14, 1951 |
| 2,619,730 | Carter | Dec. 2, 1952 |
| 2,647,346 | Conradson | Aug. 4, 1953 |
| 2,665,922 | Bard | Jan. 12, 1954 |

OTHER REFERENCES

Technical Drawing, Giesecke et al. The MacMillan Co. of New York 1949, pgs. 68 and 69, sec. 79.